United States Patent
Kipp et al.

(10) Patent No.: US 8,020,943 B2
(45) Date of Patent: Sep. 20, 2011

(54) AIRCRAFT WHEEL ASSEMBLY

(75) Inventors: Richard A. Kipp, Oakwood, OH (US); John P. Swank, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 736 days.

(21) Appl. No.: 12/088,464

(22) PCT Filed: Sep. 29, 2006

(86) PCT No.: PCT/US2006/038425
§ 371 (c)(1), (2), (4) Date: Mar. 28, 2008

(87) PCT Pub. No.: WO2007/041490
PCT Pub. Date: Apr. 12, 2007

(65) Prior Publication Data
US 2008/0251639 A1    Oct. 16, 2008

Related U.S. Application Data

(60) Provisional application No. 60/721,716, filed on Sep. 29, 2005.

(51) Int. Cl.
*B60B 3/00* (2006.01)
(52) U.S. Cl. .................. 301/5.1; 301/9.1; 244/103 R
(58) Field of Classification Search .............. 244/103 R; 301/9.1, 37.36, 95.108, 95.103, 95.11, 43, 301/53, 5.1, 66, 1.6, 80, 64.702, 64.706, 301/35.58; 152/152.1
See application file for complete search history.

(56) References Cited

U.S. PATENT DOCUMENTS

| | | | | |
|---|---|---|---|---|
| 383,966 A * | 6/1888 | Maurino | ........................ | 301/66 |
| 772,651 A * | 10/1904 | Felmlee | .................... | 301/95.102 |
| 907,316 A * | 12/1908 | Craig | ........................ | 301/95.11 |
| 1,378,303 A * | 5/1921 | Willmon | ...................... | 152/69 |
| 1,394,477 A * | 10/1921 | Park | .............................. | 301/43 |
| 4,604,008 A | 8/1986 | Bone | | |
| 4,793,659 A * | 12/1988 | Oleff et al. | .............. | 301/95.102 |
| 5,676,352 A * | 10/1997 | Mayer et al. | ................ | 301/6.91 |
| 5,820,224 A * | 10/1998 | Dimatteo, Jr. | ............ | 301/35.58 |
| 5,833,324 A * | 11/1998 | Conradsson | .................. | 301/5.1 |
| 6,196,638 B1 * | 3/2001 | Mizuno et al. | .......... | 301/95.108 |
| 6,230,848 B1 * | 5/2001 | Niebling et al. | .......... | 301/105.1 |
| 6,402,256 B1 * | 6/2002 | Mercat | ..................... | 301/95.108 |

FOREIGN PATENT DOCUMENTS

| | | |
|---|---|---|
| EP | 0 438 719 A1 | 7/1991 |
| GB | 362 791 A | 12/1931 |
| GB | 2 261 857 A | 6/1993 |

OTHER PUBLICATIONS

International Search Report of International Application No. PCT/US2006/038425, filed Sep. 29, 2006, published in English as WO 2007/041490.

* cited by examiner

*Primary Examiner* — Galen Barefoot
(74) *Attorney, Agent, or Firm* — Snell & Wilmer L.L.P.

(57) ABSTRACT

A wheel assembly (10) is disclosed, including a wheel base (14) and a wheel rim member (16). The wheel base (14) has along at least a portion of its length a non-circular cross sectional outer surface (86). The wheel rim member (16) has along at least a portion of its length a mating non-circular cross sectional inner surface (88). The inner surface (88) of the wheel rim member (16) interacts with the outer surface (86) of the wheel base (14) to restrict relative rotation of the wheel rim member (16) on the wheel base (14).

9 Claims, 2 Drawing Sheets

AIRCRAFT WHEEL ASSEMBLY

RELATED APPLICATION DATA

This application is a national phase of International Application No. PCT/US2006/038425, filed Sep. 29, 2006, and published in the English language under International Publication No. WO 2007/041490 A1.

FIELD OF THE INVENTION

This invention relates to an aircraft wheel assembly and more particularly to a separable wheel rim structure with an anti-rotation feature.

BACKGROUND OF THE INVENTION

Aircraft wheel assemblies typically comprise a wheel base to which a separable wheel rim member is secured together by a locking ring. In a wheel assembly of this type, a pneumatic tire is slid axially on the wheel base followed by the wheel rim member. The locking ring, which is split to enable the locking ring to be circumferentially expanded, is then installed in a groove in the wheel base. When the tire is inflated, its inboard and outboard beads axially urge apart the wheel base and wheel rim member, with the locking ring limiting such axial separation and thereby securing the wheel rim member to the wheel base.

SUMMARY OF THE INVENTION

The present invention provides a wheel assembly including a wheel base and wheel rim member with improved coupling characteristics. The wheel base has along at least a portion of its length a non-circular cross sectional outer surface. The wheel rim member has along at least a portion of its length a mating non-circular cross sectional inner surface. The inner surface of the wheel rim member interacts with the outer surface of the wheel base to restrict relative rotation of the wheel rim member on the wheel base.

The inner surface of the wheel rim member preferably is slightly larger than the outer surface of the wheel base so as to permit relative sliding axial movement between the wheel base and wheel rim member.

According a preferred embodiment of the invention, a diametrical cross section of the outer surface of the wheel base is greater than the narrowest diametrical cross section of the inner surface of the wheel rim member. In this way, during rotation of the wheel assembly the outer surface of the wheel base engages the inner surface of the wheel rim member, thereby transmitting torque between the wheel base and wheel rim member.

The wheel base of the wheel assembly can include a plurality of arcuate segments and a plurality of intermediate segments alternately disposed circumferentially about the axis of rotation, and the outermost radial dimensions of the arcuate segments and intermediate segments form the non-circular cross sectional outer surface of the wheel base. The intermediate segments can have a linear or nonlinear surface and may be configured in any suitable manner to effect a non-circular cross sectional surface. According to a preferred embodiment, the intermediate segments are flat and disposed tangentially relative to adjacent arcuate segments and tangentially relative to a circumference disposed a prescribed radial distance from the axis of rotation. The arcuate segments are preferably equally circumferentially spaced apart by the respective intermediate segments. The arcuate segments may be identical to each other, or alternate in different shapes and sizes, or each comprise their own shape and size. Similarly, the intermediate segments can be identical to each other, or alternate in different shapes and sizes, or each comprise their own shape and size.

The inner surface of the wheel rim member includes a plurality of arcuate portions and a plurality of intermediate portions that correspond to the respective arcuate segments and intermediate segments of the outer surface of the wheel base. However, the inner surface of the wheel rim member need not correspond to the outer surface of the wheel base so long as the inner surface of the wheel rim member interacts with the outer surface of the wheel base to restrict relative rotation of the wheel rim member and the wheel base.

In a preferred embodiment of the invention, the inner surface of the wheel rim member and the outer surface of the wheel base each have a polygon geometry with rounded corners between adjacent sides. Similarly, in a preferred embodiment the polygon geometry of the inner surface of the wheel rim member is symmetric about its diameter at a prescribed circumferential location of the wheel rim member.

The foregoing and other features of the invention are hereinafter fully described and particularly pointed out in the claims, the following description and the annexed drawings setting forth in detail illustrative embodiments of the invention, such being indicative, however, of but a few of the various ways in which the principles of the invention may be employed.

DETAILED DESCRIPTION

Figure 1:
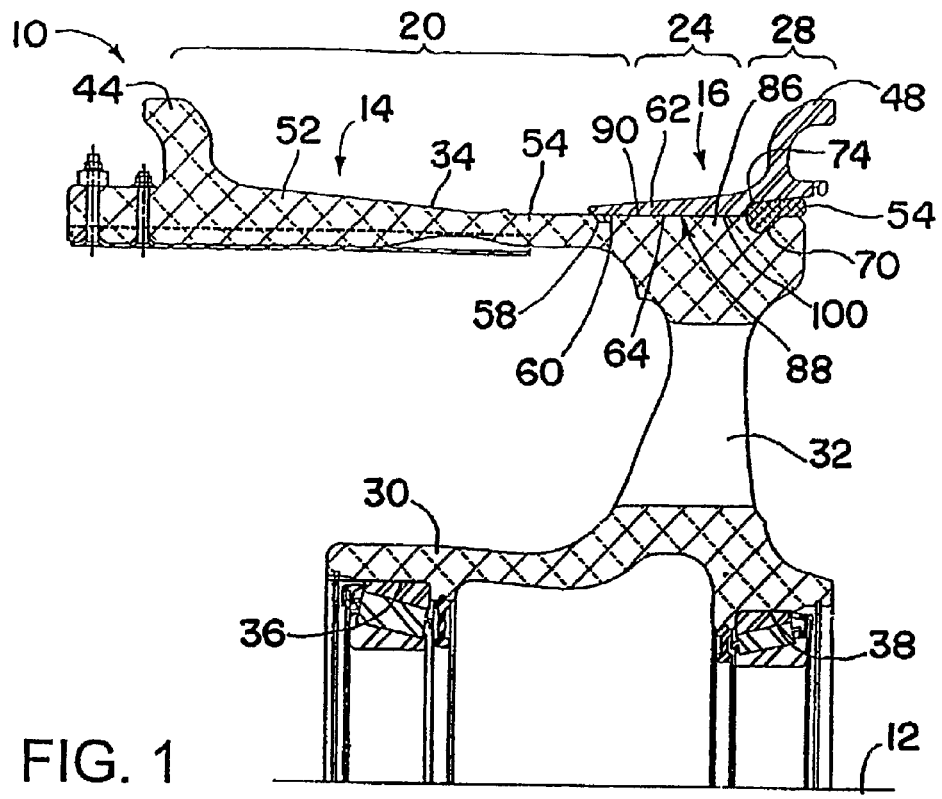
FIG. 1 is a partial cross-sectional view of a wheel assembly according to the invention, such view being taken along the line 1-1 in FIG. 3.
Figure 2:
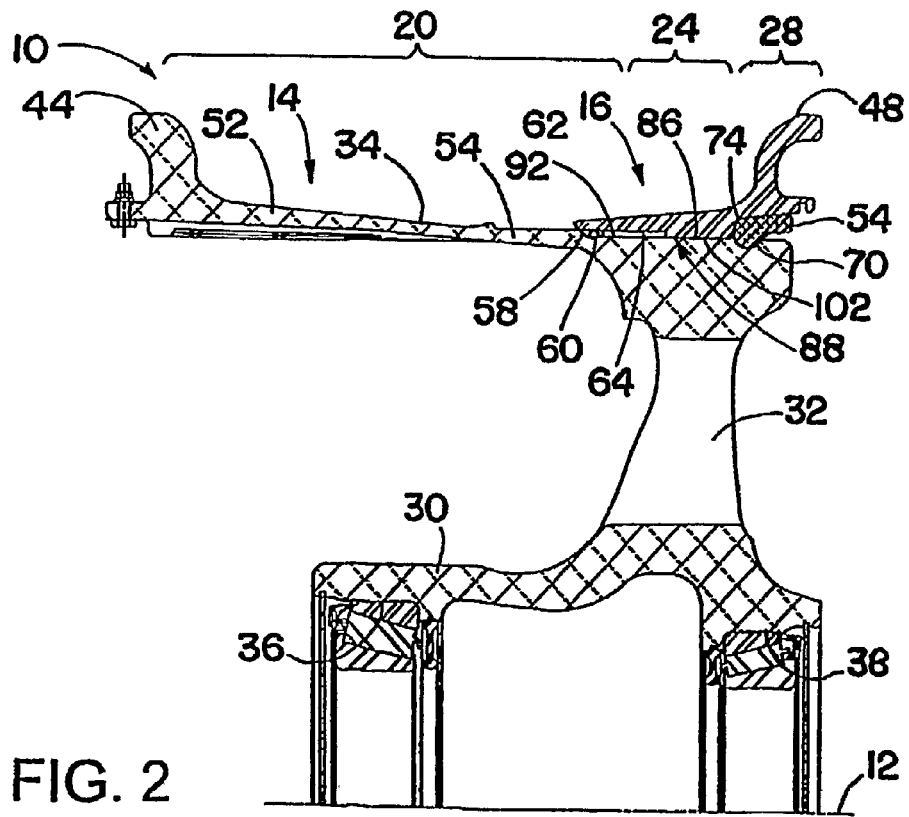
FIG. 2 is a partial cross-sectional view of the wheel assembly according the invention, such view being taken along the line 2-2 in FIG. 3.

Referring now in detail to the drawings, and initially to FIGS. 1 and 2, a wheel rim member assembly 10 according to the invention has a longitudinal axis 12 and includes a wheel base 14 and a separable wheel rim member 16 which together support a tire (not shown) thereon. The wheel assembly 10 has three sections, a sealing section 20, a rotationally restricting section 24, and an axially locking section 28, which in the illustrated embodiment are arranged in that order. In accordance with the present invention, in the rotationally locking section 24 the wheel rim member 16 and wheel base 14 have respective inner and outer non-circular surfaces that interact with each other to restrict relative rotation, while permitting relative axial movement, between the wheel rim member 16 and the wheel base 14. This and other features of the wheel assembly 10 have been found to transmit more torque than other wheel assemblies, and with respect to prior wheel assemblies in general, to reduce stress concentration risers, reduce backlash, and provide improved concentricity and self-centering between the wheel base 14 and wheel rim member 16.

The wheel base 14 includes a cylindrical hub portion 30, a web portion 32, and an axially extending outer wheel section 34. The hub portion 30 has a pair of axially spaced annular recesses 36 and 38 that receive suitable bearings for supporting the wheel for rotation on an axle (not shown) having the longitudinal axis 12 as its center. The web portion 32 extends radially outwardly from one side of the hub portion 30 and terminates into the outer wheel section 34.

The outer wheel section 34 of the wheel base 14 includes an annular rim flange 44, which in the illustrated embodiment is shown at the inboard side (left side of FIGS. 1 and 2) of the wheel assembly 10. The wheel rim member 16 likewise includes an annular rim flange 48, disposed opposite that of the flange 44, that is, on the outboard side of the wheel assembly 10. Such flanges 34 and 44 support respective inboard and outboard beads of a tire in a known manner.

The outer wheel section 34 further includes a tapered portion 52 and a cylindrical portion 54. The cylindrical portion 54 is located in the sealing section 20 of the wheel assembly 10 and has an annular groove 58 for receiving a gasket 60 or other suitable sealing member. The wheel rim member 16 includes a mating axially extending annular leg 62 that has a cylindrical opening 64 for receiving the cylindrical portion 54 of the outer wheel section 34. The cylindrical opening 64 is slightly larger than the cylindrical portion 54 to enable relative axial and rotatable sliding engagement between the wheel rim member 16 and the wheel base 14. The axial dimension of the annular leg 62 is of sufficient length to enable the wheel rim member 16 to be slid leftwardly in FIGS. 1 and 2 to provide adequate clearance to insert (or remove) a locking ring 54 into (or from) a recess 70 in the outer wheel section 34 of the wheel base 14, and to be slid rightwardly to cover the groove 58 and gasket 60. When the annular leg 62 is in its installed position, shown for example in FIGS. 1 and 2, the annular leg 62 extends over the groove 58 to sandwich the gasket 60 between the wheel base 14 and the wheel rim member 16 and create a seal therebetween.

The outer wheel section 34 of the wheel base 14 and the flange 48 of the wheel rim member 16 each have an annular recess 70 and 74, as is shown in the axially locking section 28 of the wheel assembly 10. The annular recess 74 in the wheel rim member 16 is curved to compliment the curvature of the annular recess 70 in the wheel base 14. The recesses 70 and 74 are sized and dimensioned to conform to opposite sides of the lobe of the locking ring 54.

In assembling the wheel assembly 10, initially an uninflated pneumatic tire is slid over the tapered portion 52 of the outer wheel section 34 and the sealing gasket 60 is mounted within the groove 58 in the cylindrical portion 54 of the outer wheel section 34. The wheel rim member 16 is then slid onto the wheel base 14 (leftwardly as viewed in FIGS. 1 and 2) and the locking ring 54 is positioned into the recess 70. The tire is then inflated and the respective beads of the tire exert a separating force on the respective rim flanges 34 and 44. This force moves the wheel rim member 16 rightwardly (as viewed in FIGS. 1 and 2) relative to the wheel base 14 until the wall of the recess 74 of the wheel rim member 16 engages the lobe-shaped portion of the locking ring 54. With the full pressurization of the tire on the wheel assembly 10, the locking ring 54 firmly secures the wheel rim member 16 on the wheel base 14.

Referring now to the rotationally locking section 24 of the wheel assembly 10, the outer wheel section 34 of the wheel base 14 also includes a non-circular cross sectional outer surface portion 86. The non-circular cross sectional outer surface 86 is axially outboard of (to the right of in FIGS. 1 and 2) the cylindrical portion 54 of the outer wheel section 34. The wheel rim member 16 and more particularly the leg portion 40 thereof has a mating non-circular cross sectional inner surface portion 88, which slidably axially receives the non-circular cross sectional outer surface portion 86 of the wheel base 14.

Figure 3:
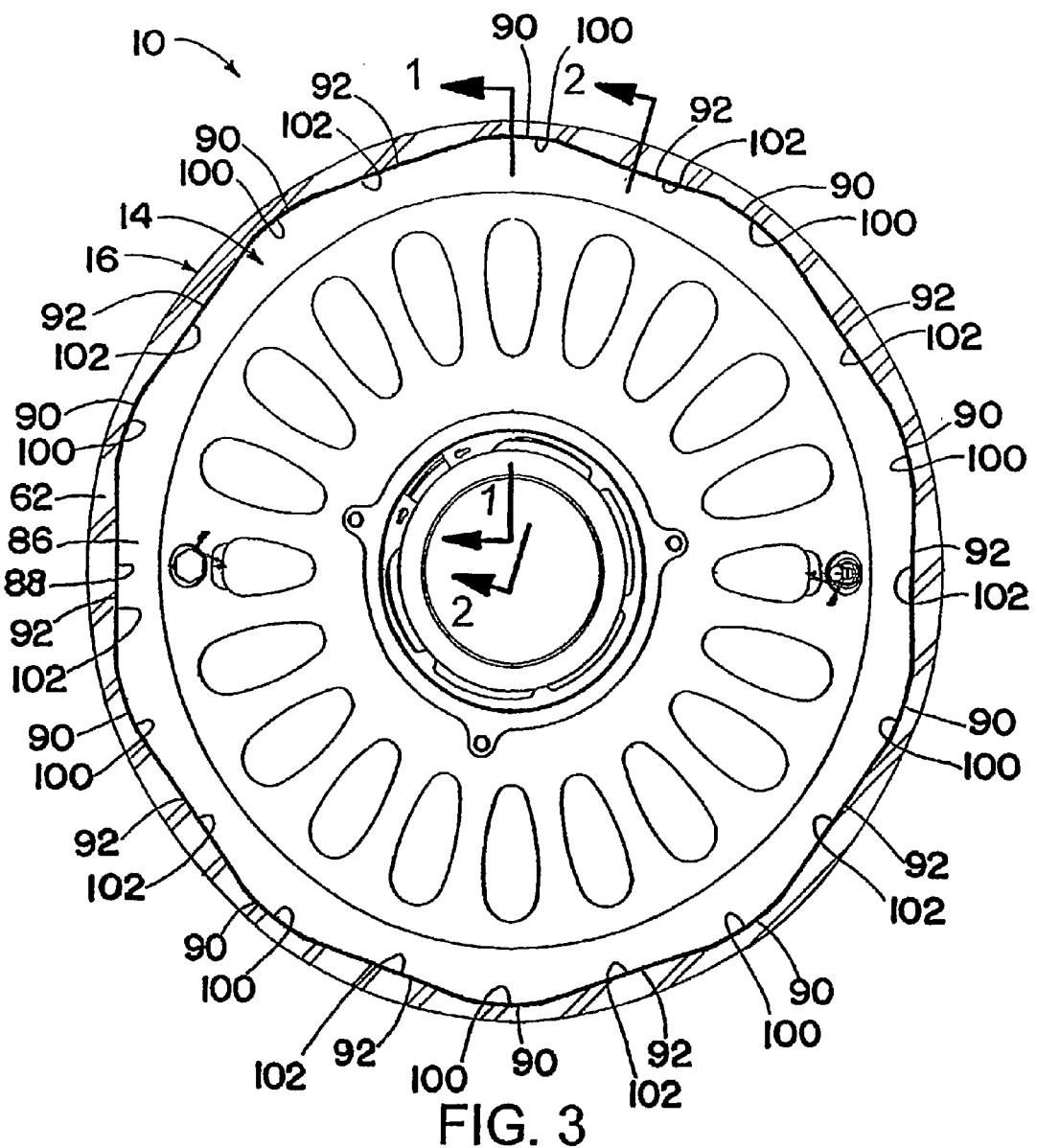
FIG. 3 is a front end view of the wheel assembly according to the invention, a locking ring and flange thereof not being shown for purposes of clarity.
Figure 3A:
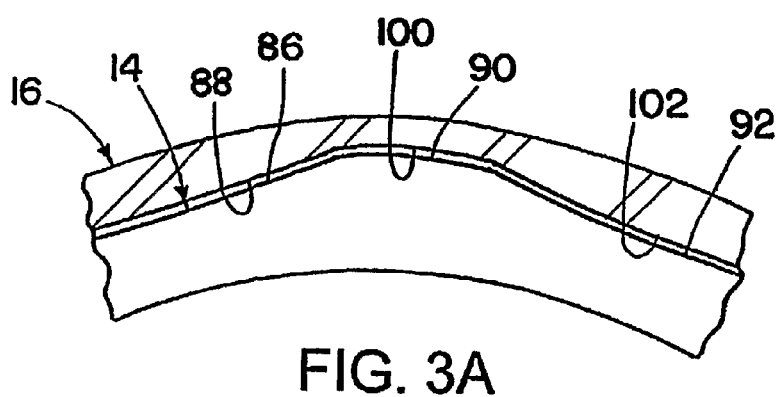
FIG. 3A is an enlarged view of an arcuate portion of the wheel assembly of FIG. 3, the space between a wheel base and wheel rim member thereof being exaggerated for purposes of clarity.

FIGS. 3 and 3A show details of the non-circular cross sectional outer surface 86 and non-circular cross sectional inner surface 88.

The non-circular outer surface 86 has an outer periphery having a non-circular geometry in transverse cross section, and the non-circular inner surface 88 has a corresponding inner periphery having a similar non-circular geometry in transverse cross section. In the illustrated exemplary embodiment, each non-circular geometry is a polygonal geometry. More specifically, the illustrated non-circular outer surface 86 includes multiple arcuate segments 90 that are circumferentially spaced apart by intermediate segments 92, and the non-circular inner surface 88 is defined by corresponding arcuate portions 100 and intermediate portions 102. In the illustrated embodiment, the intermediate segments 92 and intermediate portions 102 are flat. The intermediate segments 92 are disposed tangentially relative to the arcuate segments 90 and relative to a circumference disposed a prescribed radial distance from the longitudinal axis 12. The intermediate portions 102 and arcuate portions 100 have a similar tangential relationship. Also, in the as-shown embodiment there are ten arcuate segments and portions 90 and 100, and ten intermediate segments and portions 92 and 102, and the segments 90 and 92, and portions 100 and 102 are equally circumferentially spaced apart. Consequently, the angle between circumferentially adjacent arcuate segments 90 or portions 100 is 36 degrees and the angle between circumferentially adjacent intermediate segments 92 or portions 102 is 36 degrees. Of course, other configurations and arrangements of arcuate and intermediate segments can be used.

As is shown in FIG. 1, the outermost radial dimensions of the respective arcuate segments 90 coincide axially with the outer circumference of the generally cylindrical portion 54 of the wheel base 14 and, as is shown in FIGS. 2 and 3, the intermediate segments 92 are disposed radially inwardly relative to the outermost radial dimensions of the arcuate segments 90. Similarly, the innermost radial dimensions of the respective arcuate portions 100 coincide with the generally cylindrical opening 64 of the wheel rim member 16 and, as is shown in FIGS. 2 and 3, the intermediate portions 102 are disposed radially inwardly relative to the innermost radial dimensions of the arcuate portions 100.

During rotation of the wheel assembly 10, torque is transferred between the wheel base 14 and the wheel rim member 16 via the mating engagement of the respective outer and inner peripheries of the wheel base 14 and wheel rim member 16, the details of which are more fully described below.

Turning to FIG. 3A, which is an exaggerated view of an arcuate portion of FIG. 3, the cross section of the non-circular inner surface 88 is slightly larger than the cross section of the non-circular outer surface 86 to allow axial sliding of the wheel rim member 16 relative to the wheel base 14. Also, the diametrical cross section of the outer periphery of the non-circular outer surface 86 at the outermost radial dimensions of the respective arcuate segments 90 is greater than the diametrical cross section of the inner periphery of the non-circular inner surface 88 at the innermost radial dimensions of the respective arcuate portions 100. This effects a rotational interference between the outer periphery of the wheel base 14 and the inner periphery of the wheel rim member 16. Consequently, as the wheel base 14 and wheel rim member 16 rotate relative to one another, the outer periphery of the wheel base 14 engages the inner periphery of the wheel rim member 16, thereby transmitting torque between the wheel base 14 and wheel rim member 16.

Also, as the wheel base 14 and wheel rim member 16 rotate relative to one another the wheel rim member 16 shifts slightly angularly about the axis 12 relative to the wheel base 14, owing to the non-circular inner surface 88 being slightly larger than the non-circular outer surface 86. As a result of the slight angular movement or shift, the arcuate segments 90 and intermediate segments 92 of the wheel base 14 engage the arcuate portions 100 and intermediate portions 102 of the wheel rim member 16. This engagement, in turn, rotatably couples the wheel rim member 16 to the wheel base 14, enabling the rotation of the two as a single assembly and permitting the transmission of torque therebetween.

Several advantages are realized by the aforedescribed wheel assembly 10. The mating engagement between the wheel base 14 and wheel rim member 16 occurs at circumferentially equally spaced locations around the longitudinal axis 12 of the wheel assembly 10 (i.e., at every 36 degrees in the illustrated embodiment). Thus, stresses exhibited in the wheel base 14 and wheel rim member 16, due to for example torque being exerted on the wheel assembly 10, are distributed around the circumference of the wheel base 14 and wheel rim assembly 16.

Also, the non-circular outer surface 86 and the non-circular inner surface 88 advantageously produce a self-centering action so that the wheel base 14 becomes centered in the wheel rim member 16 during rotation. This has been found to reduce backlash and be more effective in maintaining concentricity between the wheel base 14 and the wheel rim member 16 than in some prior wheel assemblies that rely on other types of connections.

In the illustrated embodiment, the non-circular geometries of the respective non-circular outer surface 86 and non-circular inner surface 88 are symmetric about their respective diameters at prescribed circumferential locations of the respective non-circular outer surface 86 and non-circular inner surface 88. As is shown in FIG. 3, the non-circular geometries are symmetric about their respective diameters at the circumferential midpoints of the arcuate segments and portions 90 and 92, and the circumferential midpoints of the intermediate segments and portions 100 and 102. It will be appreciated by those skilled in the art that the non-circular geometries can be asymmetric about any of their respective diameters. For example, in an alternative embodiment, the non-circular outer surface 86 can include an odd number of (for example, nine) equally circumferentially spaced apart arcuate and intermediate segments 90 and 92, and the non-circular inner surface 88 can have an odd number of (for example, nine) corresponding arcuate and intermediate portions 100 and 102, in which case the spacing between circumferentially adjacent segments 90 and 92 is 40 degrees, and the spacing between circumferentially adjacent portions 100 and 102 is 40 degrees.

It also is noted that although the arcuate segments 90 in the illustrated embodiment are identical about the longitudinal axis 12, the segments 90 can differ in shape and size. For example, circumferentially adjacent arcuate segments 90 can alternate about the axis 12 between arcuate segments having a first radius of curvature and arcuate segments having a second radius of curvature. Additionally and/or alternatively, circumferentially adjacent arcuate segments 90 can alternate between a first arcuate length and a second arcuate length. Of course, the arcuate portions 100 likewise can take on alternative configurations, and such alternatives are contemplated as falling within the scope of the claimed invention. An elliptical profile may also be used to provide rotational interference between the non-circular outer surface 86 and non-circular inner surface 88.

Also, although the illustrated intermediate segments 92 of the wheel base 14 are flat, it will be appreciated that the segments 92 can alternatively, or additionally, have a non-linear shape in cross section. For example, the intermediate segments 92 can have an arcuate shape in cross section, each segment forming a radially outwardly opening, or concave, segment, and the ends of such concave segments blending into the ends of the adjacent arcuate segments 90 (i.e., the convex segments). The intermediate portions 102 likewise can take on alternative configurations, and such alternatives are contemplated as falling within the scope of the claimed invention.

The wheel assembly 10 of the present invention also simplifies manufacturing and assembly of same relative to other methods of rotational coupling. Also, the axially movable feature of the non-circular wheel base 14 and wheel rim member 16 is convenient for assembly purposes, as there are fewer parts to assemble than, for example, a keyed connection.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A wheel assembly having an axis of rotation, comprising:
   a wheel base having along at least a portion of its length a non-circular cross sectional outer surface;
   a wheel rim member having along at least a portion of its length a mating non-circular cross sectional inner surface that interacts with the outer surface to restrict relative rotation of the wheel rim member on the wheel base;
   wherein the inner surface of the wheel rim member defines a plurality of arcuate portions and a plurality of intermediate portions, wherein the plurality of arcuate portions and the plurality of intermediate portions respectively correspond to the respective arcuate segments and intermediate segments of the outer surface of the wheel base.

2. A wheel assembly as set forth in claim 1, wherein the inner surface of the wheel rim member is slightly larger than the outer surface of the wheel base so as to permit relative sliding axial movement between the wheel base and wheel rim member.

3. A wheel assembly as set forth in claim 1, wherein at least one diametrical cross section of the outer surface of the wheel base is greater than the narrowest diametrical cross section of the inner surface of the wheel rim member, such that during rotation of the wheel assembly the outer surface of the wheel base engages the inner surface of the wheel rim member, thereby transmitting torque between the wheel base and wheel rim member.

4. A wheel assembly as set forth in claim 1, wherein the intermediate segments are flat and disposed tangentially relative to the arcuate segments and tangentially relative to a circumference disposed a prescribed radial distance from the axis of rotation.

5. A wheel assembly as set forth in claim 1, wherein the arcuate segments are equally circumferentially spaced apart by the respective intermediate segments.

6. A wheel assembly as set forth in claim 1, wherein the arcuate segments are identical to each other.

7. A wheel assembly as set forth in claim 1, wherein the intermediate segments are identical to each other.

8. The wheel assembly as set forth in claim 1, wherein the angle between circumferentially adjacent arcuate segments is about 36 degrees.

9. The wheel assembly as set forth in claim 8, wherein the angle between circumferentially adjacent intermediate segments is about 36 degrees.

* * * * *